Figure 1:
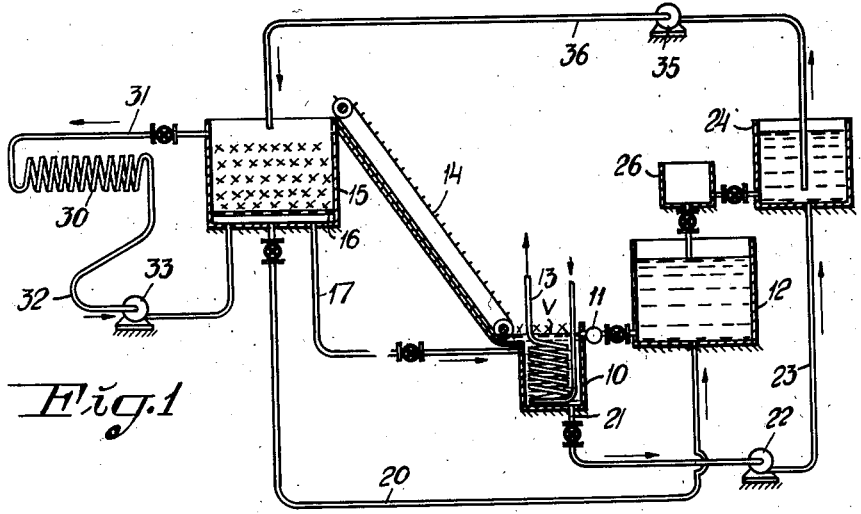
Figure 2:
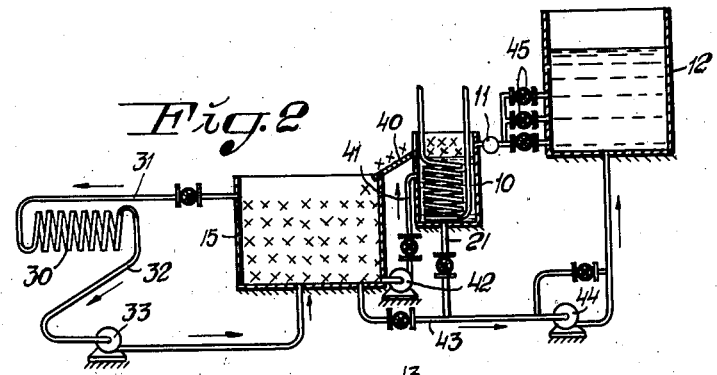

Dec. 14, 1937. E. ÖMAN 2,101,953

METHOD AND APPARATUS FOR PRODUCING COLD

Filed Sept. 12, 1936

E. Öman
INVENTOR

By Glascock Downing & Seebold
Attys.

Patented Dec. 14, 1937

2,101,953

UNITED STATES PATENT OFFICE

2,101,953

METHOD AND APPARATUS FOR PRODUCING COLD

Erik Öman, Stocksund, Sweden

Application September 12, 1936, Serial No. 100,546
In Sweden September 21, 1935

15 Claims. (Cl. 62—95)

In several cases where artificial refrigeration is used the cold consumption is very variable. A typical example thereof is the refrigeration in dairies in which the cold consumption is great during a few hours of the day but small if none during the remaining part of the day. A refrigerating plant for this and similar purposes calculated for the highest load will, thus, be very large and expensive.

In order to take up peak loads of a refrigerating plant it has been proposed to provide the plant with a cold accumulator which is "charged" during periods of low load and "discharged" during periods of high load. Hitherto these cold accumulators consisted of a bulk of a liquid of low freezing point, the cold contents of which as a consequence of its low temperature were utilized for the accumulation. These contents are, however, relatively low, and, thus, large bulks of liquid are required for taking up relatively great peaks of load. This is the case even when the liquid is cooled down to very low temperatures which, however, requires a corresponding low temperature of the refrigerant used which is unfavourable from the point of view of refrigeration.

It has also been proposed for cold storage to utilize the heat of melting which is given off by a substance when passing from the solid phase into the liquid phase. However, in such cases the substance was enclosed in a cooling element in which on freezing it formed a coherent solid body the cold contents of which could only be utilized within said cooling element proper.

The present invention relates to a method for producing cold in refrigerating plants operating at varying loads which permits storage of cold in an effective and economical manner and utilization of said cold at any desired place. The method comprises subjecting a solution of a substance in a solvent (brine) to a temperature below the freezing point of the solution by means of excess of cold at disposal at low or no load, thereby causing solvent or solution to be transferred into solid phase in the form of crystals, and withdrawing cold at high load from the solid phase thus obtained by said solid phase being transferred into liquid phase.

As solvent one may use water and as substance dissolved therein a salt or salts, i. e. a soluble chloride, sulphate, carbonate, nitrate and the like, especially of alkali metals, either alone or two or more in admixture. Instead of salts it is, however, also possible to use alkalies, acids, alcohol, sugar, glycerin, glycol and so on. In order to prevent rusting of the conduits it may be suitable to use a slightly alkaline solution.

By using such a water solution the ice frozen out is obtained in the form of crystals and not as an ice mirror on the cooling surfaces. This is of great advantage for the utilization of the ice as a store of cold, as such ice or snow crystals do not adhere rigidly to the cooling surfaces as ice mirrors do but are easily separable therefrom and are further in such a finely divided state that they are easily transportable either as such or together with solution in the form of a suspension therein.

The cold for freezing may be delivered by a refrigerator of a refrigerating machine or cold air, especially in winter time, or cold gases. In order to facilitate the separation of the crystals from the cooling surfaces the freezing may be carried out under agitation, or the cooling surfaces may be subjected to a scraping, brushing or similar action. Generally, the circulation of the solution through the freezing vessel is, however, sufficient for the separation of the crystals. The cooling surface may be submerged into the solution, or the solution may be brought to sprinkle down on the surface. The cooling surface may be movable, e. g. have the form of a drum.

The freezing may be extended more or less far, e. g. until the total quantity of solvent is transferred into solid phase. The mixture of ice crystals and solution may as such be used as store of cold, but usually it is preferred to separate the solid phase, i. e. the ice crystals, from the solution, before cold is withdrawn. This separation may preferably take place more or less continuously. When the freezing is carried out in vessels, in which the cooling surface is submerged in the solution, the ice crystals will rise to the surface and collect there in the form of a layer which is easily removable.

In order to carry out the freezing operation in a solution of as low concentration as possible which is suitable from the point of view of refrigeration, concentrated solution formed during the freezing operation may be removed from the freezing vessel more or less continuously and fresh solution be substituted therefor more or less continuously.

Preferably, the cold is withdrawn from the solid phase (ice or snow crystals) by means of a solution which may be of the same kind as that used during the freezing operation, said solution being pumped through the store of cold and the cold consuming place (cold consumer) and thence back to the store of cold. When the solution is passing through the store of cold or cold storer so much of the ice or snow crystals is melted as to cause the solution to be cooled down onto or nearly onto the freezing point, and when it is passing through the cold consumer the temperature rises, then falling again in the cold storer and so on.

In many cases it is suitable to carry out the freezing operation out of a solution having an eutectical point. In such cases the freezing is preferably carried out at the same temperature at which cold is withdrawn from the solid phase, and out of a solution which has its eutecticum at this temperature. Examples of such solutions are:

| | Percent | | °C. |
|---|---|---|---|
| KCl-solution of | 19.3 | eutectic temperature | −9° |
| KNO$_3$-solution of | 11.2 | eutectic temperature | −3° |
| ZnSO$_4$-solution of | 27.2 | eutectic temperature | −6.5° |
| Al$_2$(SO$_4$)$_3$-solution of | 23 | eutectic temperature | −4° |

The eutectic point of a solution may be varied with regard to concentration as well as to temperature by adding substances, especially salts, whereby it is always possible to procure a solution having the desired eutectic point.

The invention will be more fully described with reference to embodiments of same shown diagrammatically by way of example on the accompanying drawing, in which connection also other features characterizing the invention will be set forth.

On the drawing, Figs. 1 to 4 show each one embodiment of the invention.

In the embodiment shown in Fig. 1 reference numeral 10 designates a vessel, the freezing vessel, connected over a float valve 11 with a receptacle 12 arranged at a higher level than the vessel 10 and serving as storage container for the brine to be frozen. This brine flows by its own weight from the receptacle 12 into the freezing vessel 10 in which it is held at constant level $v$ by the float valve 11. The vessel 10 is provided with means for cooling the brine contained therein, said means, according to the figure, comprising a cooling coil 13, e. g. the refrigerator coil of a refrigerating machine. However, said means may also consist of any other cooling device, e. g. a cooling drum, cooling pan or the like. By any suitable means, e. g. an agitator scraping device or the like, the cooling surface in the freezing vessel 10 may be held clean. The ice (snow) formed collects on the surface of the brine in the freezing vessel 10, from where it is conveyed by means of any suitable means, e. g. the conveyor 14, into a container 15 arranged at a higher level than the vessel 10 and also receptacle 12, said container 15 serving as storer or accumulator for the ice produced. The conveyor 14 is so arranged as to permit solution carried along by the ice to flow back into the freezing vessel 10. The storer 15 is provided with a perforated bottom 16, and the space below said bottom is connected with the upper part of the freezing vessel 10 by means of a conduit 17. The storer 15 is also connected with receptacle 12 by means of a conduit 20 which, preferably, opens at the bottom of said receptacle.

According as ice is formed in the freezing vessel 10 the concentration of the brine in said vessel would rise continuously. However, such an increase of concentration would cause a corresponding fall of the freezing point of the brine which is unfavourable for the ice production, as in such case the refrigerating machinery used would have to deliver cold through the cooling coil 13 of a corresponding lower temperature. In order to prevent an increase of concentration in the freezing vessel 10, one may remove concentrated solution which has collected at the bottom of said vessel through a conduit 21 e. g. by means of a pump 22 which conducts said solution through a conduit 23 into a container 24. After corresponding dilution in a diluting receptacle 26 the solution may be returned to the receptacle 12.

In this manner it is possible to continue the freezing of the brine in the freezing vessel 10 without the concentration in said vessel rising too much. The liquid level in receptacle 12 sinks, and more and more snow is accumulated in storer 15 which is hereby charged.

30 designates a cold consumer operating at varying load and connected with the cold storer 15 through an inlet conduit 31 and an outlet conduit 32, the latter conduit having a pump 33 inserted therein. The cold is preferably withdrawn by means of a solution, which is circulated by the pump 33 from the cold storer 15 through conduit 31, cold consumer 30 and conduit 32 back to the cold storer 15. Preferably, this solution is of the same kind as that of the freezing system 10, 12, 15 and should, preferably, be concentrated. As such solution one may to advantage use concentrated solution from the container 24, a pump 35 conducting said solution to the cold storer 15 through a conduit 36. It is suitable to have the solution in the cold storer 15 to circulate from below and upwards as hereby ice crystals will be brought along by the solution, thereby increasing the cooling capacity thereof. However, the direction of circulation may also be reversed, in which case solution from the conduit 31 is caused to sprinkle down over the ice in the storer 15 which needs not to be filled with solution which is necessary in the former case. The solution or the mixture of solution and ice crystals enters the cold consumer at low temperature, is heated therein and returns at a somewhat higher temperature to the cold storer 15 in which it melts some ice and is again cooled down and so on. The circulation is continued, until a sufficient quantity of cold has been withdrawn from the storer or until the total quantity of ice therein has been melted (=discharged storer).

During this discharge the freezing system 10, 12, 15 may be cut out. When the cold storer is to be re-charged the solution of the storer 15 which is now diluted is conducted therefrom through conduit 20 into storage receptacle 12 by self-flow or by the pump 22. The solution in the discharge system 30, 31, 32 may preferably be retained. Thereafter the period of discharge begins again.

In the embodiment according to Fig. 1 the storage receptacle 12 and the cold storer 15 are placed at such a level in relation to each other and to the freezing vessel 10 as to permit the brine to flow by its own weight from the cold storer to freezing vessel and storage receptacle and from the latter to freezing vessel, whereas the ice produced is conveyed from freezing vessel 10 to cold storer 15 by means of a conveying device. In the embodiment shown in Fig. 2 the cold storer 15 is placed at a lower level than freezing vessel 10 and storage receptacle 12, the solution being pumped from the cold storer 15 to the two other receptacles, whereas the ice produced is conveyed from the freezing vessel 10 to the cold storer 15 along an inclined surface 40 without any mechanical conveying means. From the cold storer 15 solution is pumped through conduit 41 by a pump 42 into the upper part of the freezing vessel 10, and at the end of the period of discharge the diluted solution is pumped through conduit 43 and pump 44 back to the storage receptacle 12, into which it is introduced at the bottom. As in the previous embodiment the same pump 44 may also serve to remove concentrated solution from freezing vessel 10 through conduit 21. Concentrated solution is introduced at the bottom of the storage receptacle 12, it being suitable during the charging period to retain the concentrated solution in said receptacle as a layer on the bottom of same. For this purpose the outlet from the storage receptacle 12 to the float valve 11 is arranged at a distance from the bottom. Preferably, two or more such outlets 45 are provided at different levels. In this manner it is possible to feed the freezing vessel 10 with diluted solution from the storage receptacle 12 and to cause the concentrated solution to collect on the bottom of the receptacle 12 without admixing with the diluted solution. In this case the charging period is interrupted, when the liquid level in the storage receptacle 12 has sunk to the level of the concentrated layer. When the storer is then to be discharged, this concentrated solution from the storage receptacle 12 together with concentrated solution from the freezing vessel 10 are used as circulating solution in the discharge system 30 to 33 in the manner above described.

Figure 3:
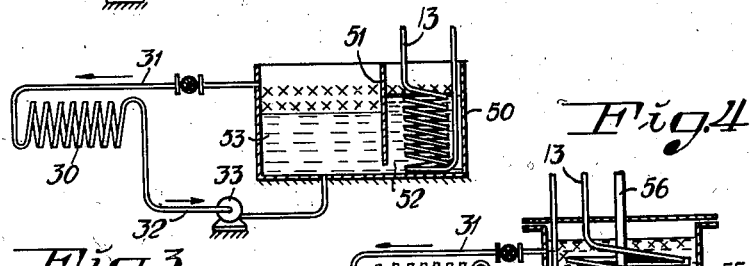

In Fig. 3 an embodiment is shown diagrammatically in which freezing vessel, storage receptacle for brine and cold storer are built together to one unit. The freezing system consists of a single vessel 50 filled with brine in which the cooling coil 13 is submerged. Provided within the vessel 50 is a partition 51 separating a chamber 52 serving as freezing space from a chamber 53 serving as combined brine storage receptacle and cold storer. The discharge system 30 to 33 is connected with chamber 53, a mixture of solution and ice crystals collected on the surface being circulated through said system.

Figure 4:
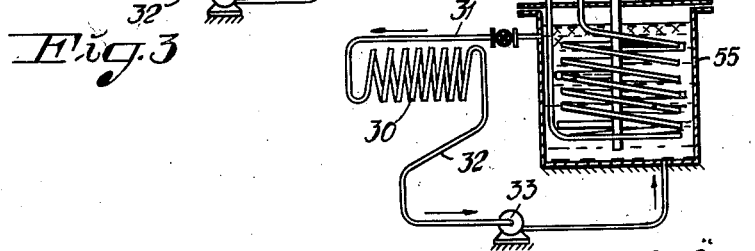

The embodiment shown in Fig. 3 may be further simplified by removing the partition 51, in which case, consequently, during the charging period the ice is permitted to remain in the freezing vessel, which, thus, also serves as cold storer. An example of such an arrangement is shown in Fig. 4.

In this figure, 55 designates a combined freezing vessel and cold storer filled with brine in which the cooling coil 13 from e. g. a refrigerating machine is submerged as before. Preferably, an agitator 56 is provided in the vessel 55. During the charging period, i. e. at low load of the cold consumer 30, ice is formed in the vessel 55, and during the discharging period solution or a mixture of ice crystals and solution is brought to circulate through the cold consumer 30, e. g. by means of pump 33.

Evidently, two or more such apparatuses which serve both as freezing vessel and cold storer may in different manner be combined with one or more cold consumers. The arrangement may be such that one (or more) of the apparatuses is permanently connected with the circulation system of the cold consumer, whereas another apparatus (or other apparatuses) may be connected with or disconnected from said system in such manner as to be cut out at low load of the cold consumer while being charged with ice, and to be automatically switched in at increasing load, when the temperature has attained a given value, thereby serving as cold storer. The apparatuses may operate with solution of the same or different concentration. In certain cases the temperature of the apparatus permanently switched in may be so high that no ice is formed in same. The apparatus in which ice is formed should be provided with an agitator, scraper, brush or the like to remove the ice crystals from the cooling surfaces, which means may be in function, only when ice is frozen out in the apparatus, i. e. during the charging period. This may for instance be effected by a driving means for said ice removing means being controlled by the temperature of the solution in the apparatus in such manner that the driving means is automatically started, when said temperature has sunk to the freezing point of the solution (formation of ice), and is automatically cut out, when the temperature has risen beyond this value.

As mentioned above it is suitable in certain cases to operate with a solution with eutecticum. In such case the freezing may take place at the eutectic point of the solution so as to cause a mixture of ice crystals and salt crystals to be formed. Also the withdrawal of cold by means of a solution, preferably of the same concentration and composition as that out of which the freezing has taken place is effected at the eutectic temperature of the solution. By suitably selecting the dissolved substance this temperature may be varied at will. Especially in the embodiments shown in Figs. 3 and 4 it is suitable to operate with solutions with eutecticum.

What I claim is:—

1. A method of producing cold in refrigerating plants which operate at varying load, comprising subjecting a solution of a substance in a solvent to a temperature below its freezing point by means of excess of cold at disposal at low load, thereby causing solvent to be transferred into solid phase in the form of crystals, separating solid phase from the solution, transferring at high load such separated solid phase into liquid phase, and utilizing the cold thus produced.

2. A method of producing cold in refrigerating plants which operate at varying load, comprising subjecting a solution of a substance in a solvent to a temperature below its freezing point by means of excess of cold at disposal at low load, thereby causing solvent to be transferred into solid phase in the form of crystals, continuously separating solid phase from the solution, transferring at high load such separated solid phase into liquid phase, and utilizing the cold thus produced.

3. A method of producing cold in refrigerating plants which operate at varying load, comprising subjecting a solution of a substance in a solvent to a temperature below its freezing point by means of excess of cold at disposal at low load, thereby causing solvent to be transferred into solid phase in the form of crystals, continuously separating solid phase from the surface of the solution, transferring at high load such separated solid phase into liquid phase, and utilizing the cold thus produced.

4. A method of producing cold in refrigerating plants which operate at varying load, comprising subjecting a solution of a substance in a solvent to a temperature below its freezing point by means of excess of cold at disposal at low load, thereby causing solvent to be transferred into solid phase in the form of crystals, separating solid phase from the solution, transferring at high load such separated solid phase into liquid phase by bringing it into contact with a solution of a substance in a solvent, and utilizing the cold thus produced.

5. A method of producing cold in refrigerating plants which operate at varying load, comprising subjecting a solution of a substance in a solvent to a temperature below its freezing point by means of excess of cold at disposal at low load, thereby causing solvent to be transferred into solid phase in the form of crystals, separating solid phase from the solution, transferring at high load such separated solid phase into liquid phase by bringing it into contact with a solution of the same substance in the same solvent as those of the solution which was subjected to freezing, and utilizing the cold thus produced.

6. A method of producing cold in refrigerating plants which operate at varying load, comprising subjecting a solution of a substance in a solvent to a temperature below its freezing point by means of excess of cold at disposal at low load, thereby causing solvent to be transferred into solid phase in the form of crystals, removing concentrated solution formed during freezing and replacing same by fresh solution, transferring at high load solid phase thus obtained into liquid phase, and utilizing the cold thus produced.

7. A method of producing cold in refrigerating plants which operate at varying load, comprising subjecting a solution of a substance in a solvent to a temperature below its freezing point by means of excess of cold at disposal at low load, thereby causing solvent to be transferred into solid phase in the form of crystals, removing concentrated solution formed during freezing and replacing same by fresh solution, separating solid phase from the solution, transferring at high load such separated solid phase into liquid phase, and utilizing the cold thus produced.

8. A method of producing cold in refrigerating plants which operate at varying load, comprising subjecting a solution of a substance in a solvent to a temperature below its freezing point by means of excess of cold at disposal at low load, thereby causing solvent to be transferred into solid phase in the form of crystals, continuously removing concentrated solution formed during freezing and continuously replacing same by fresh solution, separating solid phase from the solution, transferring at high load such separated solid phase into liquid phase, and utilizing the cold thus produced.

9. A method of producing cold in refrigerating plants which operate at varying load, comprising subjecting a solution of a substance in a solvent to a temperature below its freezing point by means of excess of cold at disposal at low load, thereby causing solvent to be transferred into solid phase in the form of crystals, removing concentrated solution formed during freezing and replacing same by fresh solution, separating solid phase from the solution, transferring at high load such separated solid phase into liquid phase by bringing it into contact with concentrated solution thus removed, and utilizing the cold thus produced.

10. A method of producing cold in refrigerating plants which operate at varying load, comprising subjecting an eutectic solution of a substance in a solvent to its eutectic temperature by means of excess of cold at disposal at low load, thereby causing solution to be transferred into solid phase in the form of crystals, separating solid phase from the solution, transferring such separated solid phase into liquid phase at said eutectic temperature, and utilizing the cold thus produced.

11. An apparatus for producing cold to be used by a cold consumer operating at varying load, comprising a vessel, a receptacle for a solution of a substance in a solvent, means to feed said vessel with solution from said receptacle, means to supply cold to said vessel so as to freeze out crystals from the solution contained therein, a storer, means to feed said storer with crystals from the freezing vessel, and means to connect said storer in closed circuit with said cold consumer.

12. An apparatus for producing cold to be used by a cold consumer operating at varying load, comprising a vessel, a receptacle for a solution of a substance in a solvent, means to feed said vessel with solution from said receptacle, means to supply cold to said vessel so as to freeze out crystals from the solution contained therein, a storer, means to feed said storer with crystals from the freezing vessel, and means comprising a pump to connect said storer in closed circuit with said cold consumer.

13. An apparatus for producing cold to be used by a cold consumer operating at varying load, comprising a vessel, a receptacle for a solution of a substance in a solvent, means to feed said vessel with solution from said receptacle, means to supply cold to said vessel so as to freeze out crystals from the solution contained therein, means to remove from the freezing vessel concentrated solution formed during the freezing, a storer, means to feed said storer with crystals from said freezing vessel, and means to connect said storer in closed circuit with said cold consumer.

14. An apparatus for producing cold to be used by a cold consumer operating at varying load, comprising a vessel, a receptacle for a solution of a substance in a solvent, means continuously to feed said vessel with solution from said receptacle, means to supply cold to said vessel so as to freeze out crystals from the solution contained therein, a storer, means continuously to feed said storer with crystals from the freezing vessel, and means to connect said storer in closed circuit with said cold consumer.

15. An apparatus for producing cold to be used by a cold consumer operating at varying load, comprising a vessel, a receptacle for a solution of a substance in a solvent, means to feed said vessel with solution from said receptacle, means to supply cold to said vessel so as to freeze out crystals from the solution contained therein, a storer, means to feed said storer with crystals from said freezing vessel, a conduit connecting said storer and said freezing vessel for the return to the latter of solution accompanying the crystals, and means to connect said storer in closed circuit with said cold consumer.

ERIK ÖMAN.